Jan. 31, 1956  H. B. VAN RADEN  2,733,059
SPRING SHACKLE CONSTRUCTION
Filed Feb. 13, 1953  2 Sheets-Sheet 1
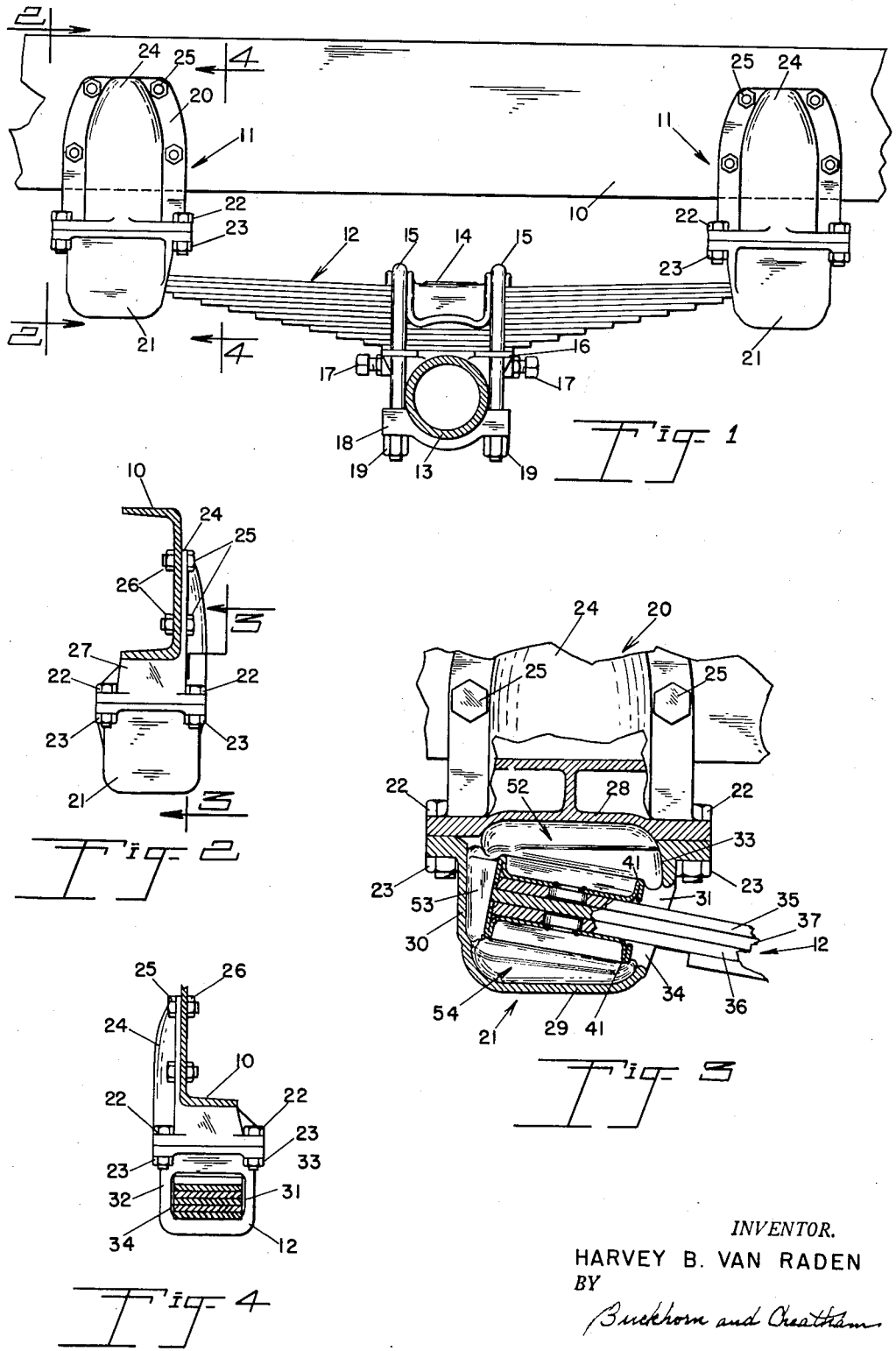
INVENTOR.
HARVEY B. VAN RADEN
BY
Buckhorn and Cheatham
ATTORNEY Jan. 31, 1956    H. B. VAN RADEN    2,733,059
SPRING SHACKLE CONSTRUCTION
Filed Feb. 13, 1953    2 Sheets-Sheet 2
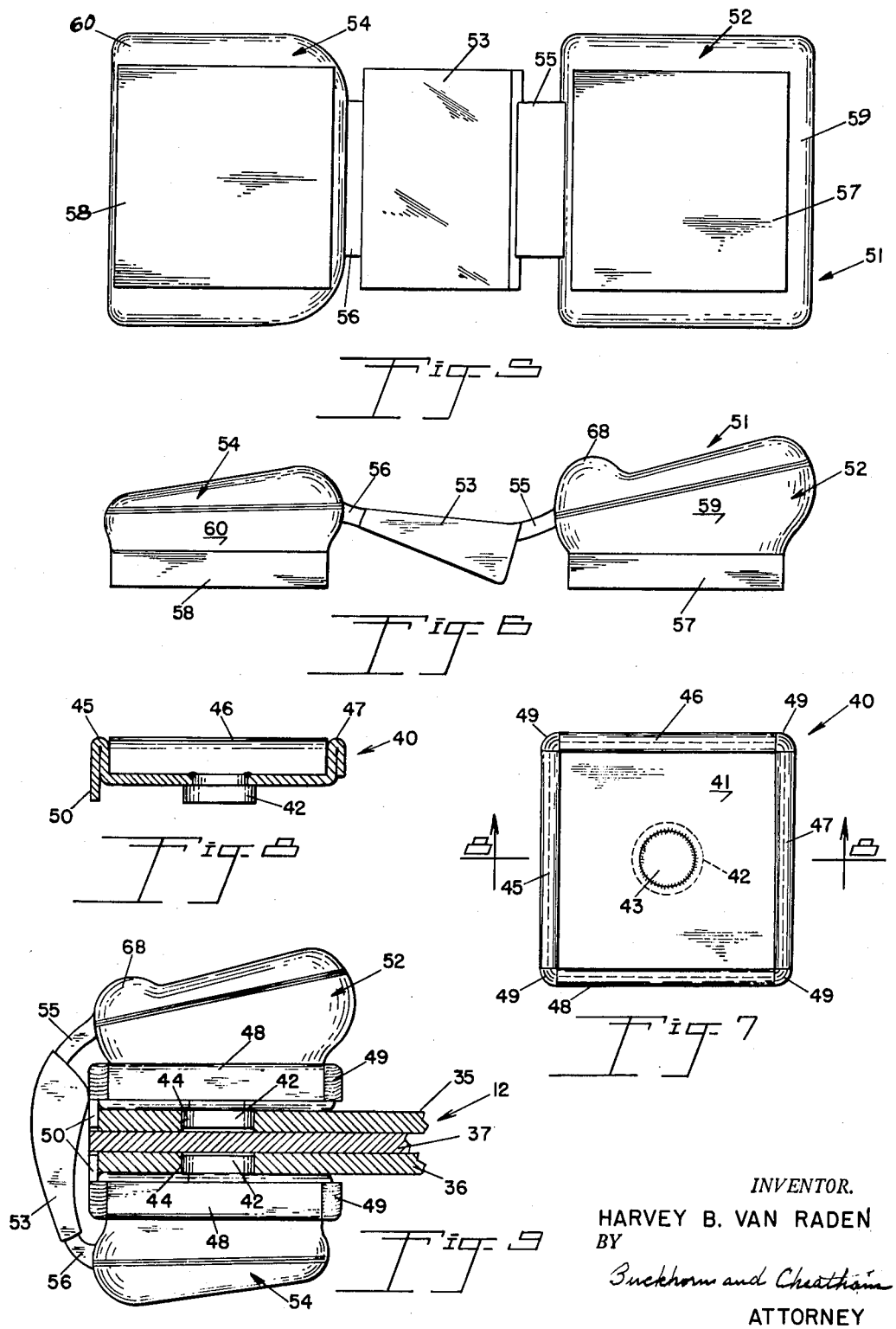
INVENTOR.
HARVEY B. VAN RADEN
BY
Buckhorn and Cheatham
ATTORNEY United States Patent Office 2,733,059
Patented Jan. 31, 1956

2,733,059

SPRING SHACKLE CONSTRUCTION

Harvey B. Van Raden, Portland, Oreg., assignor to Ne Peer Company, Portland, Oreg., a copartnership Application February 13, 1953, Serial No. 336,777

7 Claims. (Cl. 267—30)

The present invention relates to a spring assembly for a vehicle such as a truck or trailer, the invention being directed toward means to anchor an end or ends of a leaf spring to the vehicle. A principal object of the present invention is to provide means to support the body of the vehicle in a shockproof manner regardless of the weight of its load. The present invention comprises means whereby a leaf spring may have a greater effective length and support the load toward the tips of its end portions when the load is light, and a progressively shorter effective length as the load progressively increases, thereby eliminating road shock effects heretofore encountered under various load conditions. The present invention is particularly useful, but not to be limited to such use, in such vehicles as tank trailers or trucks designed for transporting gasoline, milk or other fluids. Such vehicles are extremely heavy when fully loaded and require the use of extraordinarily strong springs, with the result that the body is practically rigidly supported when empty. Since such a vehicle when empty is usually returning from a distant point to pick up another load it is usually traveling at a high speed and any obstruction which the wheels engage transmits a terrific, destructive blow to the body through the non-flexing springs, in some cases resulting in the tearing out of internal partitions or rupturing of the tank. The present invention eliminates this condition by supporting the tank or body upon limber springs when lightly loaded and upon increasingly stiffer springs as the load increases.

A further object of the present invention is to provide a construction of the foregoing character which is sturdy, made of relatively few, inexpensive, rugged and easily assembled parts which may be rapidly replaced in the event of excessive wear or failure.

A further object of the present invention is to provide means securely to anchor an end or ends of a leaf spring to the frame of a supported vehicle whereby an axle mounted upon the springs may be initially assembled and maintained in exact transverse alignment with respect to the longitudinal axis of the vehicle under all conditions of loading, thereby reducing tire wear and eliminating accidents heretofore resulting from axle misalignment.

The objects and advantages of the present invention may be more readily ascertained from inspection of the accompanying drawings taken in connection with the following specification wherein like numerals refer to like parts throughout, and in which a preferred embodiment of the invention is illustrated and described.

In the drawings,

Fig. 1 is a partial, side view of a single axle assembly of a common type, consisting of a single axle housing or trunnion mounted upon leaf springs, the leaf springs having each end maintained in a spring shackle constructed in accordance with the present invention, with the spring being shown under maximum loading;

Fig. 2 is a vertical section taken substantially along line 2—2 of Fig. 1;

Fig. 3 is a vertical section taken substantially along line 3—3 of Fig. 2, the view being on an enlarged scale and illustrating the spring end under minimum loading;

Fig. 4 is a vertical section taken substantially along line 4—4 of Fig. 1;

Fig. 5 is a bottom view of a resilient, pad-forming member incorporated in the present assembly;

Fig. 6 is a side elevation of the pad-forming member;

Fig. 7 is a plan view of a pan utilized in the present invention;

Fig. 8 is a sectional view taken along line 8—8 of Fig. 7; and

Fig. 9 is a subassembly view of a leaf spring, partially broken away, showing the pad-forming member and pans associated therewith prior to compression of the pads in a housing.

A portion of a vehicle is illustrated in Fig. 1 and comprises a longitudinal frame member 10 consisting of a channel bar having its flanges turned inwardly. A pair of separable housings 11 are mounted on the frame member 10 in longitudinally spaced, depending relation, and a leaf spring generally indicated at 12 has its ends secured in the housings 11 and spans the space therebetween, the central portion of the spring being secured to and resting upon a transverse, tubular member 13 representing a trunnion or axle housing. As illustrated, the leaf spring is secured to the tubular member 13 by clamping means comprising an upper saddle member 14 having side flanges embracing the sides of the upper leaves of the leaf spring and a pair of transverse grooves at its opposite ends for engaging the bights of a pair of downwardly extending U-bolts 15. The legs of the U-bolts snugly embrace the lateral edges of the leaf springs to hold them in alignment and pass through ears in a lower saddle member 16 welded to the upper surface of the member 13, the saddle member 16 supporting an adjustable member (not shown) which is suitably attached to the leaf spring and which may be longitudinally shifted by means of adjustment bolts 17 whereby the member 13 may be shifted longitudinally of the leaf spring prior to tightening the assembly. The lower ends of the U-bolts pass through a U-shaped clamp 18 engaging the lower surface of the member 13, and are threadedly engaged by clamping nuts 19 for tightening the assembly in position. Details of the adjustable saddle and associated members may be ascertained from the copending application of Frederick F. Van Raden, Serial No. 336,819, filed concurrently herewith. It is to be appreciated that other means may be provided for attaching an axle or trunnion to a leaf spring mounted on a vehicle in accordance with the present invention.

Each of the housings 11 comprises an upper part 20 and a complementary lower part 21 secured in edge-to-edge relation by bolts 22 passing through matching openings in flanges at the adjacent, horizontal edges of the parts, and cooperating nuts 23 whereby the adjacent edges of the parts may be drawn firmly together. The upper part 20 may comprise a vertical flange 24 adapted to be secured to the web of the member 10 by bolts 25 and cooperating nuts 26, and a horizontal portion 27 adapted to be seated against the lower flange of the member 10. It is to be appreciated that other forms of attachment means may be provided to affix the housing to a structural member of the frame, the same being varied to match the structure of the vehicle. The upper part comprises an upper wall 28 of the housing cavity, the same being preferably slightly dished as illustrated in Fig. 3. The complementary lower housing part 21 provides the major portion of the housing and comprises a slightly dished lower wall 29, a slightly dished rear wall 30, substantially parallel side walls, and a slightly dished front wall 33 having a large opening 34 therethrough of substantially rectangular outline. The opening 34 is slightly wider than the leaf spring as seen in Fig. 4, and is preferably substantially twice as deep as the end portion of the leaf spring 12 which projects into the cavity of the housing through the opening. Preferably the portion of the spring which projects into the housing comprises the three uppermost leaves which are substantially equal in length and have squared ends. However, as seen in Fig. 3, the upper leaf 35 and the third leaf 36 are equal in length, while the second leaf 37 is slightly longer. The central portions of the upper and lower walls 28 and 29, respectively, define substantially plane surfaces which are substantially parallel to each other and extend substantially horizontally, and the major portion of the rear wall 30 defines a plane surface extending substantially vertically and at right angles to the longitudinal direction of the vehicle.

A pair of pad seating pans generally indicated at 40 are seated on the upper and lower surfaces, respectively, of the end portion of the spring within the housing. The pans are separably seated on the spring in fixed relation thereto as follows. The pans are identical and each comprises a polygonal bottom wall 41 of substantially the same width as the width of the spring, and preferably having the shape of an equilateral rectangle. A cylindrical spring engaging plug 42 is suitably mounted centrally of the exterior surface of the bottom wall 41, a convenient form of mounting comprising a reduced, cylindrical stem 43 inserted into a matching opening in the bottom wall 41 and having its edge welded to the edge of the opening, as seen in Fig. 7. The cylindrical plug 42 is of slightly lesser length than the thickness of the leaf upon which the pan is seated, and is snugly seated in a matching opening 44 in the end of its associated leaf, 35 and 36 respectively, as seen in Fig. 9. Each edge of the bottom wall 41 is provided with a rectangular flap which is bent upwardly at right angles to the bottom wall and then downwardly upon itself to provide a thick, vertical wall for the pan, as indicated at 45 to 48 respectively, the vertical walls being of relatively low height so as to provide a relatively shallow, polygonal pan. The adjacent corner edges of the pan are filled in by welding the same together as indicated at 49, the construction providing a pan having a relatively broad, rounded rim without sharp edges or corners. At least one of the wall-forming flaps is of sufficient length to provide a dependent tab 50 extending from side to side of the pan below the lower surface of the bottom wall 41, the dimensions being such that the tabs 50 extend over the end edges of the spring leaves 35 and 36 and define a substantially plane, end-thrust surface together with the adjacent portions of the end walls 45 and the end of the second spring leaf 37. The assembly therefore comprises a pair of shallow pans mounted on the end of the leaf spring and facing respectively upwardly and downwardly toward the opposed housing walls 28 and 29, which pans are removably attached but rigidly maintained in definite relation to the leaves 35 and 36 upon which they are mounted. The pans are shallow and comprise upright walls defining a polygonal flange having a rounded rim.

The leaf spring end is maintained within the housing by a pair of resilient pads comprising portions of a rubberous pad-forming member indicated at 51, the member comprising an upper pad 52, an intermediate end pad 53 connected thereto by an integral, resilient link 55, and a lower pad 54 connected to the opposite end of the pad 53 by an integral link 56. Each of the three pads is substantially the same width as the leaf spring, and the upper and lower pads respectively comprise base portions 57 and 58, respectively, of the same cross-sectional configuration and depth as the pans 40 and adapted to be snugly seated therein with their bottom surfaces engaging the wall 41 and their vertical edge surfaces engaging the upright walls of the pan throughout. Each of the upper and lower pads comprises an outer portion 59 and 60, respectively, the outer edges of which extend beyond the base portion so as to overlie the rim of its associated pan. When positioned within the assembly the outer portion 59 is of greatest thickness toward the front wall 33 of the housing and progressively tapers rearwardly toward the free end of the spring, and the outer portion 60 tapers in the opposite direction. By reason of this construction the end of the leaf spring is normally maintained in an upwardly inclined position within the housing as seen in Fig. 3, the inner end of the spring being higher than the portion adjacent the opening 34. The vertical dimensions of the assembly provided by the end of the spring, the seated pans, and the upper and lower pads seated in the pans, when the resilient pads are in normal condition, is substantially greater than the vertical dimension of the interior of the housing between the walls 28 and 29. When the housing parts 20 and 21 are brought together by the bolts 22 and nuts 23, the upper and lower pads are appreciably distorted and compressed, thereby causing the end of the leaf spring to be resiliently gripped by resilient material under considerable compression. The dished walls 28 and 29 conform substantially to the outer surfaces of the pads firmly to seat the same and cause the excess material displaced by compression to overhang the rounded rim of the pan, thereby centering the leaf spring laterally with respect to the opening 34 and spacing the pans from the four vertical walls of the housing. As seen in Fig. 3, portions of the pads are compressed between the wall 33 and the adjacent walls of the pan to resist longitudinal movement of the leaf spring out of the housing.

The end thrust pad 53 comprises a substantially rectangular, tapered member having its greatest thickness adjacent the upper pad 52, the pad regularly tapering toward its connection with the pad 54, whereby the pad may snugly fill the space between the end of the spring and pan assembly defined in part by the tabs 50 and the vertical rear wall 30 of the housing. The pad 53 may be under some compression when initially positioned under light vehicle loading as illustrated in Fig. 3.

The linking portions 54 and 55 are of substantial width but minimum thickness whereby they may be flexed to permit the pad-forming member to be wrapped around the end of the assembly as seen in Fig. 9, and distorted considerably, as seen in Fig. 3, when the housing parts are brought together.

Preferably, the thinnest portion of the upper pad 52, which is adjacent the rear wall 30 when assembled, is provided with a transverse, rounded ridge 68 extending from side to side thereof whereby the vertical thickness, prior to compression, of a narrow, transverse portion of the assembly adjacent the extreme tip of the leaf spring is slightly thicker than any other portion of the assembly. This protrusion 68 must be displaced when the housing is closed and provides a greater degree of initial compression at the tip of the spring than elsewhere within the housing when the spring is in unloaded, upwardly inclined condition as shown in Fig. 3. The relatively greater resiliency of other portions of the pads permits the leaf spring to operate as a flexible spring of maximum length under minimum loading. As the loading progressively increases, the spring approaches the horizontal condition illustrated in Fig. 1 thereby causing the effective fulcrum point of the spring end progressively to travel outwardly toward the opening 34, thus decreasing the effective length of the spring and causing the load to be supported upon an effectively strong spring of minimum effective length. Thus the resiliency of the spring suspension is altered to match the load, giving good spring support under heavy loading or light loading, as the case may be.

The end thrust pad 53 acts as a buffer to prevent lengthwise shifting of the spring with respect to the housing. As the spring approaches the horizontal condition, the upper, thicker part of the pad 53 is compressed and part of the material thereof is forced downwardly toward the lower, thinner part thereof as the end of the spring assumes parallelism with the end wall 30. It will be appreciated that all of the pads will be variously distorted as the angular relationship of the spring and housing varies, but that firm grip on the spring will be maintained at all times.

It is to be appreciated that the upper and lower pads may be separate from each other, the linked construction representing a convenient assembly which may be easily formed and applied.

Having illustrated and described a preferred embodiment of my invention it should be apparent to those skilled in the art that the same permits of modification in arrangement and detail. I claim as my invention all such modifications as come within the true spirit and scope of the appended claims.

I claim:

1. A spring assembly for a vehicle comprising a separable housing having complementary upper and lower parts defining a cavity therebetween, bolt means holding said parts together, said housing having an opening thereinto at one end, a leaf spring having an end portion extending into said cavity through said opening, a pair of shallow, polygonal, pad-seating pans fixedly mounted respectively on the upper and lower surfaces of said spring end portion and facing outwardly therefrom, and a pair of resilient pads seated in said pans, said pads being of substantial thickness so as to be compressed between said housing parts and said pans upon tightening said bolt means to draw said parts together and each comprising a base portion snugly filling its associated pan and an outer portion having its edge continuously overhanging and extending outwardly beyond said pans along their lateral edges and adjacent said opening when said parts are drawn together, one of said pads being normally most thick vertically along its forward edge and tapering rearwardly and the other of said pads being oppositely tapered.

2. A vehicle spring assembly comprising a separable housing including an upper part and a lower part defining therebetween a cavity, bolt means to retain said parts in edge-to-edge relation, said lower part having an opening thereinto at one end, a leaf spring having an end portion normally extending diagonally upward into said cavity through said opening, a shallow pan secured to the upper surface of said end portion and facing the top of said upper part, a second shallow pan secured to the lower surface of said end portion and facing the bottom of said lower part, and a pair of resilient pads seated in said pans, each of said pads comprising a base portion filling its associated pan and an outer portion projecting edgewise beyond the rim of its associated pan, said spring, pans and pads being of greater vertical thickness when assembled in normal condition than the interior height of said cavity throughout, with a portion of greatest combined thickness remote from said opening whereby tightening of said bolt means causes greater compression of said pads adjacent the free end of said leaf spring than adjacent said opening.

3. The construction of claim 2 wherein said pans are rectangular in cross-section and of substantially the same area as the contiguous end surfaces of said leaf spring, and said pans comprise flange portions overlying the end edges of said leaf spring and defining therewith an end thrust surface.

4. The construction of claim 2 wherein said pans are polygonal in cross-section and of substantially the same width as said leaf spring, and said pads comprise parts of an integral, rubberous member including an intermediate portion adapted to be interposed between the end of the spring and the housing.

5. The construction of claim 2 wherein said pans are rectangular in cross-section and said pads comprise base portions snugly filling said pans and outer portions having edges extending laterally beyond the rims of said pans, one of said pads being tapered from front to rear in the longitudinal direction of said spring, and the other of said pads being tapered in the opposite direction.

6. A spring assembly comprising a housing having an opening thereinto at one end, a leaf spring having an end portion projecting into said housing through said opening, an upper, resilient pad positioned between the upper surface of the end portion of said leaf spring and the upper surface of said housing, a lower, resilient pad positioned between the lower surface of the end portion of said leaf spring and the lower surface of said housing, said upper pad being of greater thickness toward said opening and tapering toward the opposite end of said housing and said lower pad being of greater thickness toward said opposite end of said housing and tapering toward said opening whereby said spring normally projects diagonally upward into said housing from said opening, said pads being normally under greater compression toward said opposite end of said housing whereby said leaf spring is effective throughout its length under light loading and the effective length of said spring progressively decreases under progressively increasing load as said spring end portion approaches a horizontal position under loading, and a third resilient pad interposed between the end surface of said spring and the end wall of said housing opposite said opening, said third pad being thickest at the top and decreasing in thickness toward the bottom.

7. A vehicular spring end shackle comprising a housing having an opening in one end, a leaf spring having an end portion projecting into said housing, means defining oppositely extending projections at the free end of said leaf spring, and a pair of resilient pads compressed within said housing respectively between the upper and lower surfaces of said spring end portion and opposed portions of the housing, and between said projections and portions of said housing surrounding said opening, said pads being normally under greater compression in the vertical sense adjacent the free end of said spring than toward said opening, and said leaf spring end portion normally extending diagonally upward within said housing from said opening, said pads yieldably permitting said end portion to approach a horizontal position within said housing under increased loading.

References Cited in the file of this patent

UNITED STATES PATENTS

| | | |
|---|---|---|
| 1,400,563 | Masury et al. | Dec. 20, 1921 |
| 1,472,372 | Masury et al. | Oct. 30, 1923 |
| 1,582,637 | Cowell et al. | Apr. 27, 1926 |
| 1,612,810 | Gurney | Jan. 4, 1927 |
| 1,616,613 | Drumm et al. | Feb. 8, 1927 |
| 2,437,158 | Heiney | Mar. 2, 1948 |